May 9, 1939.　　　L. BISKUP　　　2,157,813
ICE CREAM DIPPER
Filed Nov. 16, 1938
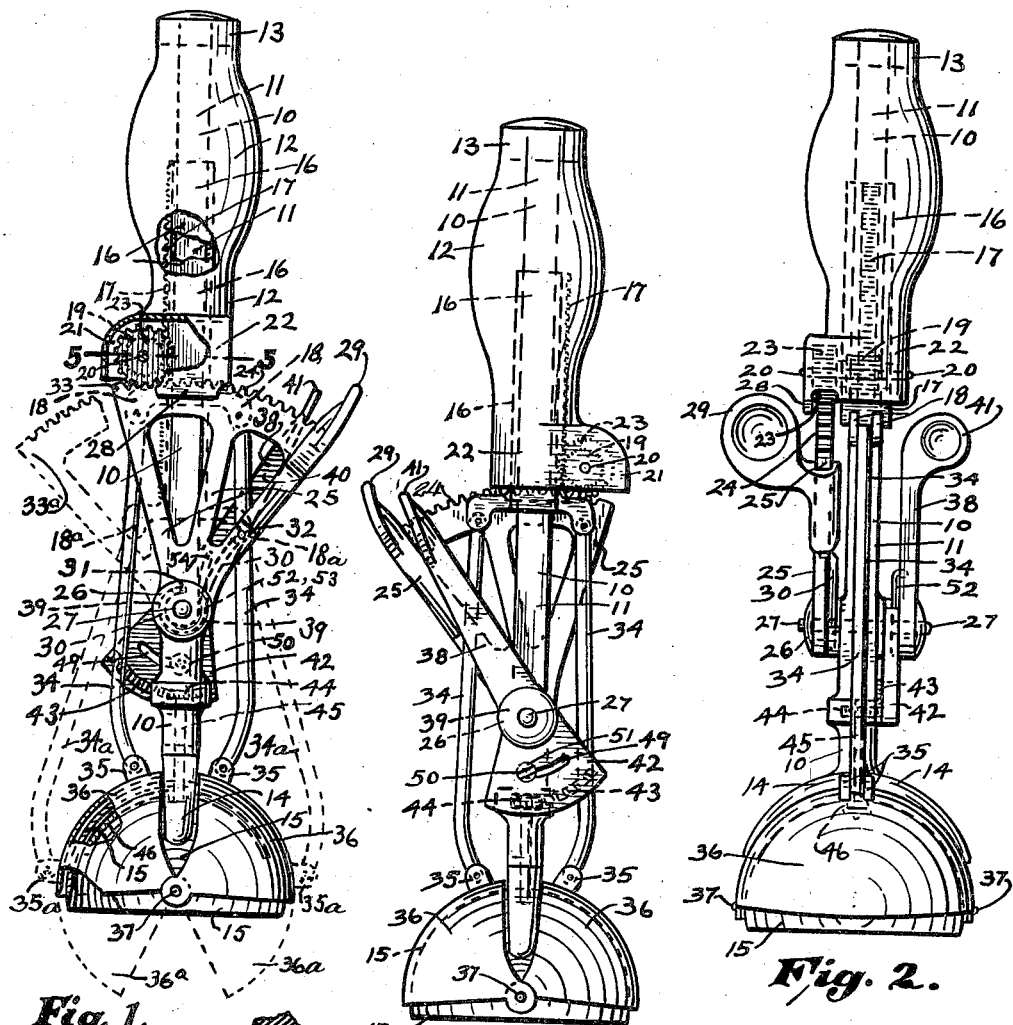
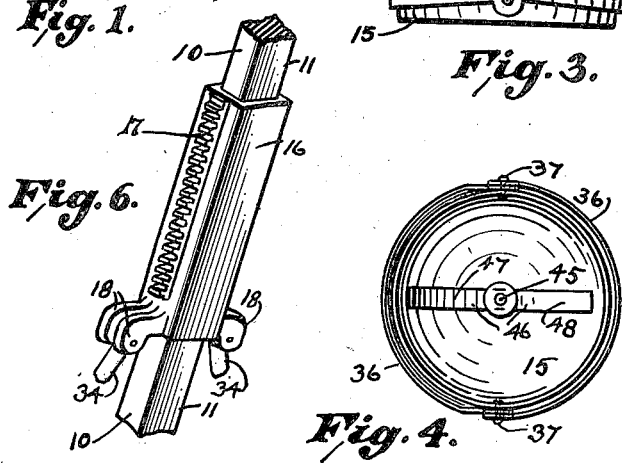
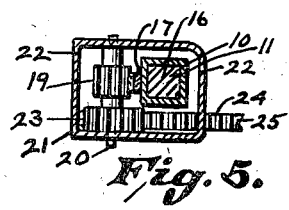
Inventor,
Leopold Biskup,
by his attorney,
J. Edward Thebaud.

Patented May 9, 1939

2,157,813

UNITED STATES PATENT OFFICE 2,157,813

ICE CREAM DIPPER

Leopold Biskup, Philadelphia, Pa., assignor of one-half to Joseph Stasinski, Philadelphia, Pa.

Application November 16, 1938, Serial No. 240,612

5 Claims. (Cl. 107—48)

This invention relates to ice cream dippers which are hand operated.

One of the objects of my invention is to provide a hand operated ice cream dipper, adapted to cut a ball of ice cream from the bulk of the same.

Another object is to provide a hand operated ice cream dipper having a bowl end portion, with its lip in a plane, transverse to the axis of the body of the dipper, enabling the operator to thrust the said bowl end portion into the bulk of the ice cream, and by the aid of the curved scoops pivoted and operated on the outside of the bowl portion, cut a ball from the bulk of the ice cream, leaving undisturbed the inner contact, of the ice cream with the inner surface of the bowl.

A further object of my invention is to provide such a construction of operating parts of a ball forming ice cream dipper, as will afford a very efficient use of the operator's hand, in causing the dipper parts to cut a ball from hard ice cream.

Another object is to provide an ice cream dipper which while being adapted to fulfill any of the above named objects, will be provided with means for cutting the ball of ice cream loose from the bowl, and with improved and efficient construction provide an ice cream dipper that is more easily operated than the ordinary dipper.

With these and other objects, which will hereinafter appear, my invention resides in certain construction, one embodiment of which is illustrated in the drawing and is hereinafter described. The functioning of the parts is explained and what I claim is set forth.

In the drawing,

Figure 1 is a side elevation of an ice cream dipper, embodying my invention.

Figure 2 is an end elevation of the dipper shown in Figure 1.

Figure 3 is an elevation of the dipper shown in Figure 1, but here showing the side opposite to that shown in Figure 1.

Figure 4 is an inverted plan of the dipper bowl with scoops pivoted on the outside thereof.

Figure 5 is a section taken on the line 5—5 of Figure 1.

Figure 6 is a perspective view of the rectangular sleeve and rack, shown in sliding engagement with and enveloping the upper rectangular rod portion of the dipper body.

In the figures the longitudinal body 10, of the ice cream dipper has an upper rectangular rod portion 11, with a handle 12 fixed thereto at the top 13 thereof, and at other places with connections not here shown. The lower end of the body 10 is formed into a yoke 14, reaching over and fixed to the bowl 15. In sliding engagement with the rectangular rod portion 11, is the rectangular sleeve 16, having centrally and longitudinally fixed to one side thereof, the straight rack 17. At the lower end of the sleeve 16, integrally project from opposite sides thereof, pairs of ears 18. The cross sections of sleeve 16 and rod portion 11 can be anything desired, other than rectangular.

The rack 17 meshes with a gear 19, fixed upon a shaft 20, journaled in the off-set portion 21, of the lower casing end 22, of the handle 12. Also fixed upon the shaft 20, is another gear 23, which is preferably made larger than the gear 19, to give greater thrusting effect to the operation of the sleeve 16. However, the gears 19 and 23, may be of equal size together, as one gear, or the gear 19 may be larger than the gear 23, according to the desire of the designer of the ice cream dipper. The gear 23 is in mesh with the circular rack portion 24, of the lever member 25, which has a hub portion 26, journaled and retained upon a cross-pin 27, fixed in the body 10. The casing end 22 has a depending lip 28, overlapping the circular rack portion 24, of the lever member 25, to guard against dislodgement of the gear 23, from meshing with the circular rack portion 24.

The member 25 has a thumb-piece 29, integral therewith, but off-set therefrom to freely pass the casing end 22. The hub portion 26, of the member 25 is hollow, to encase the encircled portion of the wire spring 30, one end 31, of which is bent and engages a hole in the body 10, while the outer end 32, engages a hole in the member 25. The spring 30 normally and forcefully brings the end 33, of the member 25, near the gear 23, holding the working parts of the dipper in position for initial operation.

To each pair of ears 18 is pivoted a bent rod 34, the lower ends of which are pivoted to ears 35, fixed upon the curved scoops 36, which are pivoted at 37, to opposite sides of the bowl 15, at a spherical axis thereof.

On the opposite side of the dipper is positioned the lever member 38, having a hollow hub portion 39, journaled and retained upon the cross-pin 27. This lever member 38, has an upwardly extending arm 40, terminating in a thumb piece 41, preferably made to come a little lower than the thumb piece 29, of the lever member 25. Extending below the hub portion 39, is a sector portion 42, having an arc of gear teeth 43, projecting toward the body 10. The center of the arc of the teeth 43, coinciding with that of the pin 27. These teeth 43 mesh with a pinion 44, whose axis coincides with that of the body 10. This pinion 44 is fixed upon a longitudinal shaft 45, journaled axially in the body 10. The lower end of this shaft 45 enters the bowl 15 centrally, and has fixed thereto, the curved scraper 46, the curvature of which enables it to lie close to the inner spherical surface of the bowl 15. While the scraper 46 is shown to have two arms 47 and 48, any number of such scraper arms may be provided. The sector portion 42 has an arcuate slot 49, engaged by a screw 50, fixed in the body 10. The head 51, of the screw 50, retains the teeth 43, in mesh with the pinion 44. The lever member 38 is normally held by a spring 52, to position its thumb piece 41, away from the body 10. The spring 52 has a curved portion 53, encased, within the hub portion 39, and has its outer ends 54, anchored in the arm 40, its other end is anchored in the body 10, opposite the hub portion 39.

In operation, the user holds the handle 12 by one hand with possibly having the fingers resting against the off-set casing portion 21. The operator holds the handle 12 in such a position as to have his thumb press on either of the thumb pieces 29 or 41, as occasion requires. Next, the bowl 15, is thrust down into the bulk of ice cream, which fills into the bowl 15, to spread over substantially its entire inner surface, leaving practically no pockets in the surface of the ice cream ball being formed. While the bowl is thus filled and the operator still holding down the dipper, his thumb is next forcefully pressed against the thumb piece 29 to force the scoops 35 to turn down, cutting into the bulk of ice cream to complete the formation of a ball thereof, the upper half of which is within the bowl 15. In this operation of forcing the scoops 35 to cut into the bulk of ice cream, there is an advantage in somewhat multiplying the effect of the thumb pressure, by having the gear 23 larger than the gear 19, so that the circular rack portion 24 moves a greater lineal length in turning the gear 23, than the lineal length traversed by the straight rack 17, when moved by the smaller gear 19, thus giving the scoops 35, connected with the sleeve 16, by rods 34, more cutting power, particularly when operating upon hard ice cream.

After thus forming the ice cream ball, the dipper with its ball is withdrawn, the thumb piece 29 being released to permit the scoops and connected parts, to resume their normal positions again, by means of the free action of the spring 30. The ice cream ball is released from the bowl 15, by pressing the thumb upon the thumb piece 41, to turn the lever member 38, to revolve the scraper 46, by means of the teeth 43, the pinion 44, and the shaft 45.

Inasmuch as changes can be made in the construction of ice cream dipper, differing from that shown and herein described, without departing from the spirit of my invention, I wish to include all forms which come within the following claims.

I claim,

1. An ice cream dipper including in combination a longitudinal body, a handle on said body, a casing at the lower end of said handle, said casing having an off-set portion, a shaft transversely journaled in said casing, two gears fixed to said shaft, a rod like portion on said body, opposite said gears, a sliding member on said rod like portion a rack on said sliding member in line with the length thereof, said rack being in mesh with one of said gears, a lever member pivoted on said body at a point remote from said gears, a curved rack portion on said lever member, in mesh with the other of said gears, a spring connecting said body with said lever member normally holding said lever member in initial operative position, a bowl fixed upon the lower end of said body, a pair of scoops pivoted on the outside of said body, and connections between said scoops and said sliding member for turning said scoops when said sliding member slides on said rod portion.

2. An ice cream dipper made in accordance with claim 1, wherein the gear meshing with said rack, on said sliding member, is smaller than the gear meshing with said curved rack portion.

3. An ice cream dipper made in accordance with claim 1, having in addition a curved scraper next to the inner curved surface of said bowl, and mechanism for manually operating said scraper.

4. An ice cream dipper made in accordance with claim 1, having in addition a second lever member pivoted upon said longitudinal body, a curved scraper next to the inner curved surface of said bowl, a shaft longitudinally journaled on said body and fixed to said scraper, a third gear fixed on said shaft, a sector portion to said second lever member, and an arc of teeth on said sector portion, meshing with said third gear.

5. In a hand operated ice cream dipper having a longitudinal body, a hand operated member on said body, pivoted scoops, at one end of said body, and a sliding member in sliding engagement with said body, connected with said scoops, two racks, one of said racks being connected with said sliding member and the other of said racks being connected with said hand operated member, and a gear connection operatively connecting said racks, to turn said scoops when moving said hand operated member.

LEOPOLD BISKUP